United States Patent Office 2,821,677
Patented Jan. 28, 1958

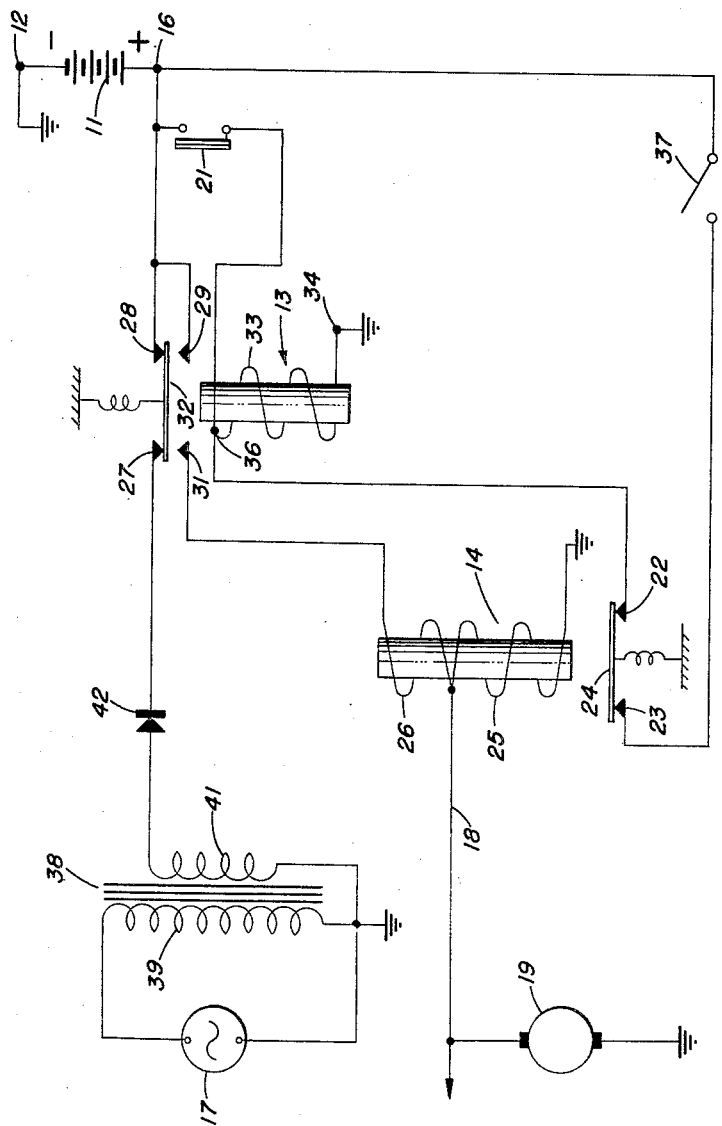

2,821,677

BATTERY CHARGING SYSTEM

Milton A. Knight, Centreville, Va.

Application August 14, 1956, Serial No. 604,049

6 Claims. (Cl. 320—56)

(Granted under Title 35, U. S. Code (1952), sec. 266)

The invention described herein may be manufactured and used by or for the Government of the United States of America for governmental purposes without the payment of any royalties thereon or therefor.

The present invention relates to a battery charging system and more particularly to an aircraft battery charging system which permits the use of a battery having a discharge voltage equal to the normal line voltage of the aircraft's D. C. electrical system.

Known aircraft battery charging systems in which the battery is charged from the aircraft's D. C. electrical system require a 24 volt battery to be used in a nominal 28 volt system since the charging voltage of a 24 volt battery is approximately 28 volts. Since the discharge voltage of a 24 volt battery may drop as low as 17 volts under load, a severe penalty is inflicted on the design of aircraft electrical equipment operated from the aircraft's D. C. electrical system since the equipment must not only be designed to normally operate on a 27 to 29 volt range, but must also be capable of operating at 17 volts. As will be obvious, many design improvements in such aircraft electrical equipment would be made possible by reducing the range of voltages upon which the equipment must operate.

The present invention permits the use of a battery having a discharge voltage equal to the normal D. C. system voltage by providing a means for charging an aircraft battery from the aircraft's A. C. electrical system without compromising the availability of the battery for immediate use, for example, in the event of generator failure.

An object of the present invention is to provide a means for charging a battery having a discharge voltage equal to the normal line voltage of a system which at times must be energized by the battery.

Another object of the present invention is to provide a means for charging an aircraft battery having a discharge voltage equal to the aircraft's normal D. C. system voltage.

Another object of the present invention is to provide a means for charging a battery from an A. C. electrical system without compromising the availability of the battery to energize a D. C. electrical system.

Another object of the invention is to provide a means for charging an aircraft battery from the aircraft's A. C. electrical system without compromising the availability of the battery to energize the aircraft's D. C. electrical system.

Other objects and many of the attendant advantages of the present invention will be readily appreciated as the same becomes better understood by reference to the following detailed description when considered in connection with the accompanying drawing wherein:

The sole figure shows an illustrative embodiment of the invention in a de-energized condition.

Referring now to the drawing there is shown an aircraft battery 11 having one terminal 12 thereof connected to ground. A double-throw contactor 13 controlled by a sensing means 14 is provided to selectively connect the other terminal 16 of battery 11 to the aircraft's A. C. electrical system, schematically represented by an A. C. generator 17, to be charged therefrom or to the aircraft's D. C. electrical system 18 to supply power thereto. The D. C. system 18 is normally energized by a D. C. generator or generators 19. Battery 11 is protected against excessive charging rates by a normally open thermal relay 21 in a manner to be hereinafter fully explained.

Sensing means 14 may comprise a relay including a pair of stationary contacts 22, 23, a bridging contact member 24 biased to engage stationary contacts 22, 23, a voltage coil 25 and a current coil 26. Voltage coil 25 comprises the main operating winding of relay 14 while current coil 26 comprises an auxiliary winding employed to prevent "chattering" of the contacts of relay 14 as will be later fully explained.

Contactor 13 comprises a first pair of stationary contacts 27, 28, a second pair of stationary contacts 29, 31, a bridging contact member 32 biased to engage stationary contacts 27, 28, and an operating winding 33 having one terminal 34 connected to ground and another terminal 36 which may be connected to terminal 16 of battery 11 by a first parallel connected circuit which includes the contacts of sensing relay 14 and a manually operable switch 37 or by a second parallel connected circuit which includes thermal relay 21.

The charging circuit for battery 11 comprises a transformer 38 having a primary winding 39 connected to generator 17 and a secondary winding 41 connected to terminal 16 of battery 11 through a rectifier 42 and contacts 27, 28 and 32 of contactor 13. In a typical aircraft installation, D. C. electrical system 18 will have a nominal voltage of 28 volts; and A. C. electrical system 17 will have a nominal voltage of 115 volts. If battery 11 is the silver or nickel-cadmium type having a discharge voltage of 28 volts, the turns ratio of transformer 38 may be chosen to give an output voltage of approximately 34 volts. Transformer 38 may be of the non-regulating type so as to provide the effect of a modified constant current form of charging.

The circuit for connecting battery 11 to D. C. electrical system 18 includes contacts 29, 31 and 32 of contactor 13 and current coil 26 of sensing relay 14.

In operation, the manual switch 37 is closed. If generator 19 is de-energized, or if, for some other reason, the voltage of D. C. electrical system 18 is below the voltage of battery 11, the contacts of sensing relay 14 will remain closed. The operating winding 33 of contactor 13 will then be energized by battery 11 through the circuit including the closed contacts of sensing relay 14 and manually operable switch 37 to cause bridging contact member 32 to engage stationary contacts 29, 31. Battery 11 will then be connected to D. C. electrical system 18 to supply power thereto. It will be noted that the current flowing from battery 11 through current coil 26 and voltage coil 25 of sensing relay 14 will generate opposing fluxes therein to thereby prevent the operation of relay 14.

If now generator 19 is energized, or if, for some other reason, the voltage of D. C. electrical system 18 rises above the voltage of battery 11, current will flow from D. C. electrical system 18 to battery 11 through current coil 26 thus generating a flux aiding the flux generated by voltage coil 25 to cause operation of sensing relay 14. It will thus be seen that current coil 26 prevents operation of sensing relay 14 unless a voltage differential exists between D. C. electrical system 18 and battery 11. Operation of sensing relay 14 de-energizes contactor 13 to disconnect battery 11 from D. C. electrical system 18 and at the same time to connect battery 11 to its charging circuit.

If at any time generator 19 becomes de-energized through failure or otherwise, or if, for some other reason (for example, overload) the voltage of D. C. electrical system 18 decreases below the voltage of battery 11, sensing relay 14 will be de-energized as described above and battery 11 will be disconnected from its charging circuit and reconnected to the D. C. electrical system by contactor 13.

If battery 11 becomes overheated from excessive charging, for example, the normally open contacts of thermal relay 21 will close energizing contactor 13 to thereby disconnect battery 11 from its charging circuit and to connect it to D. C. electrical system 18. Since the D. C. system voltage and the battery voltage are normally equal, very little current will flow to battery 11 and no damage will result thereto. When battery 11 cools, the contacts of thermal relay 21 will open causing battery 11 to be disconnected from the D. C. electrical system 18 and reconnected to its charging circuit.

Obviously many modifications and variations of the present invention are possible in the light of the above teachings. It is therefore to be understood that within the scope of the appended claims, the invention may be practiced otherwise than as specifically described.

What is claimed is:

1. A battery charging system comprising: an A. C. electrical system, a D. C. electrical system, a battery, and means for selectively connecting said battery to said A. C. system to be charged therefrom or to said D. C. electrical system to supply energy thereto in response to a voltage differential between said battery and said D. C. electrical system.

2. A battery charging system comprising: an A. C. electrical system, a D. C. electrical system, a battery, means to selectively connect said battery to said A. C. system to be charged therefrom or to said D. C. system to supply energy thereto, and a sensing means responsive to a voltage differential between said battery and said D. C. electrical system to cause actuation of said battery connecting means.

3. A battery charging system comprising: an A. C. electrical system, a D. C. electrical system, a battery, means to selectively connect said battery to said A. C. electrical system to be charged therefrom or to said D. C. electrical system to supply energy thereto, sensing means operative in response to a voltage differential between said battery and said D. C. electrical system to cause actuation of said battery connecting means, and battery protective means operative to disconnect said battery from said A. C. system upon overheating of said battery.

4. A battery charging circuit comprising: an A. C. electrical circuit; a D. C. electrical circuit; a battery; a contactor having an operating winding, a pair of normally closed contacts, and a pair of normally open contacts; circuit means including said normally closed contacts for connecting said battery to said A. C. circuit to be charged therefrom; circuit means including said normally open contacts for connecting said battery to said D. C. circuit to supply energy thereto; and sensing means operative in response to a drop in voltage of said D. C. electrical system below the battery voltage to energize said contactor operating winding to thereby cause said battery to be disconnected from its charging circuit and connected to said D. C. electrical system.

5. The battery charging system of claim 4 wherein said sensing means comprises a relay having a pair of normally closed contacts connected in circuit with said contactor operating winding and a source of potential, a first operating winding connected between said D. C. electrical system and a source of reference potential and a second operating winding connected in circuit with said contactor normally open contacts between said D. C. electrical system and said battery.

6. The battery charging system of claim 5 wherein there is provided a thermal relay operable in response to overheating of said battery to connect said contactor operating winding to a source of operating potential.

References Cited in the file of this patent

UNITED STATES PATENTS

| 1,297,857 | Jacobs | Mar. 18, 1919 |
| 1,360,592 | Sloane | Nov. 30, 1920 |
| 1,386,972 | Sunderland et al. | Aug. 9, 1921 |
| 1,457,863 | Strawmyer et al. | June 5, 1923 |
| 1,662,366 | Cosgray | Mar. 13, 1928 |
| 1,874,374 | Sole | Aug. 30, 1932 |
| 2,541,935 | Potter | Feb. 13, 1951 |